United States Patent [19]
Stout, Jr. et al.

[11] Patent Number: 5,878,404
[45] Date of Patent: Mar. 2, 1999

[54] SYSTEM AND METHOD FOR MANAGING THE AMORTIZATION OF A LOAN

[75] Inventors: Richard W. Stout, Jr., Uncasville; Edgar C. Gerwig, W. Hartford, both of Conn.

[73] Assignee: Mechanics Savings Bank, Hartford, Conn.

[21] Appl. No.: 727,747

[22] Filed: Oct. 8, 1996

[51] Int. Cl.⁶ .................................................. G06F 17/60
[52] U.S. Cl. ............................. 705/38; 235/379; 235/380
[58] Field of Search ........................ 705/35, 38; 235/379, 235/380

[56] References Cited

U.S. PATENT DOCUMENTS

| | | | |
|---|---|---|---|
| 3,512,709 | 5/1970 | Schneible ................................... | 235/78 |
| 4,648,038 | 3/1987 | Roberts et al. ........................... | 705/38 |
| 4,742,457 | 5/1988 | Leon et al. ................................ | 705/35 |
| 4,876,648 | 10/1989 | Lloyd ........................................ | 705/38 |
| 5,058,009 | 10/1991 | Yoshino et al. ........................... | 705/38 |
| 5,083,270 | 1/1992 | Gross et al. .............................. | 705/35 |
| 5,611,052 | 3/1997 | Dykstra et al. ........................... | 705/38 |

OTHER PUBLICATIONS

Howard Schneider, For better or for worse, Mortgage Banking, pp. 110–117, Oct. 1995.

Business Editors, Federated Bank earnings increase, Business Wire, pp. 1–2, Apr. 1992.

*Primary Examiner*—Emanuel Todd Voeltz
*Assistant Examiner*—Raquel Alvarez
*Attorney, Agent, or Firm*—McCormick, Paulding & Huber

[57] ABSTRACT

A system for managing the amortization of a loan to a debtor includes memory, a data input module, a module for tracking principal reduction and a rate adjustment option module. The memory stores data identifying a debtor, the amount of a loan to the debtor, the principal balance of the loan, a rate of interest payable on the principal balance of the loan and the term of the loan. The data input module inputs the identifying data into the memory and records information identifying the time payments received from the debtor toward payment of principal and interest on the loan. The module for tracking the reduction in the principal balance of the loan also stores in memory the principal balance in response to the time payments. The rate adjustment option module resets the rate of interest on the principal balance in response to the debtor's election and within certain qualifying conditions. The rate of interest in the absence of the debtor's election and resetting is held fixed in the memory for the remaining term of the loan.

58 Claims, 3 Drawing Sheets

SYSTEM AND METHOD FOR MANAGING THE AMORTIZATION OF A LOAN

FIELD OF THE INVENTION

The present invention relates to systems for managing loans and, more particularly, to systems for managing the amortization of loans.

BACKGROUND OF THE INVENTION

A lending institution such as a bank provides a loan to a debtor in return for periodic time payments at a set rate of interest. The time payments are due at predetermined payment intervals, typically every month, during the period or the term sometimes defined by the number of time payments term or period of the loan. The term is sometimes defined by the number of time payments. Part of each time payment is generally allocated to paying interest on the loan, and the remainder of the payment is allocated to reducing the amount owed, known as the principal balance of the loan, and any escrow deposits. The allocation between interest and principal varies with each time payment. Most of the initial time payments are allocated to interest, while smaller amounts which are allocated to principal increase as subsequent time payments are made throughout the term of the loan. The reduction in the principal balance by the time payments is known as amortization. Known methods of calculating interest rates and amortization payments are disclosed in "The Mathematics of Investing: A Complete Reference" by Michael Thomsett, pp. 23–40.

Modern lending institutions employ computer-based loan management systems which store and process information on loans to debtors. Known systems for managing loan amortization include a device for inputting data identifying a debtor, the amount of the loan to the debtor, the principal balance of the loan, the rate of interest payable on the principal balance of the loan and the term of the loan. The input device may be a keyboard, mouse or other peripheral device of a computing platform which operates in accordance with user interface software to transfer signals indicative of the identifying data to memory. The input device also receives and records signals indicative of time payments from the debtor for credit toward principal and interest on the loan.

The memory is a device, such as a conventional computer memory module, which stores the identifying data. As is known in the art, the above-described identifying data stored in memory are typically implemented as digital electrical signals which represent ASCII characters or binary numeric values.

In response to a time payment, a loan payment module receives the time payment signals and determines the appropriate allocation of the time payment between interest and principal in accordance with known amortization methods. A loan origination and administration module tracks the reduction in the principal by the time payment, and the reduced principal balance is stored in the memory. If a time payment is not received within a payment interval, the loan origination and administration module records the delinquency in memory and typically adds a late payment fee to the amount of the loan owed.

Financial loans may be classified as fixed-rate or variable-rate. In a fixed-rate loan, a prevailing interest rate at the time the loan is made determines the rate of interest for the entire term of the loan. In a variable-rate loan, a prevailing interest rate at the time the loan is made determines the initial rate of interest. However, at set dates the rate of interest of a variable-rate loan is adjusted in accordance with a time-varying interest-rate index, such as the rate of interest payable on Treasury Bills. Interest-rate indices typically fluctuate several times a year, and may fluctuate by substantial amounts during the term of a loan. Such changes in rates are beyond the variable-rate debtor's control, and may be to his advantage or detriment depending on whether the interest rate has decreased or increased on the adjustment date.

Conventional systems for managing the amortization of loans process signals indicative of each loan in accordance with fixed-rate loan processing methods or variable-rate loan processing methods. For example, for a fixed-rate loan, the signals indicative of the rate of interest of the loan remain fixed in memory. Similarly, for a variable-rate loan, the signals indicative of the rate of interest of the loan are automatically adjusted in accordance with signals indicative of a fluctuating interest-rate index.

A debtor having a fixed-rate loan may find that after receiving a loan at a fixed rate of interest, interest rates decrease substantially below the fixed rate associated with his loan. Naturally, the debtor prefers a loan with a low rate of interest so that the time payment amount will be as low as possible. Unfortunately, a drawback of a fixed-rate loan is that the debtor cannot automatically take advantage of decreases in interest rates. On the other hand, the fixed-rate debtor is not adversely affected by increases in interest rates which work against variable-rate debtors. Accordingly, known systems for managing loan amortization do not adjust the signals indicative of the interest rate on fixed-rate loans.

To take advantage of a decrease in interest rates, the fixed-rate debtor must refinance his loan, that is, re-apply, re-qualify and take out a new loan at the decreased rate of interest. Refinancing is a costly option which involves a number of fees, such as fees paid to the lending institution, attorneys and title searchers. Therefore, refinancing is not a viable alternative unless interest rates have dropped significantly below the initial interest rate associated with the fixed-rate loan. Accordingly, known systems for managing loan amortization do not automatically implement refinancing of a fixed-rate loan.

It would be advantageous to have a system for managing the amortization of a loan which automatically resets the rate of interest stored in memory in response to the debtor's election, yet holds the initial rate of interest stored in memory fixed in the absence of such an election. The present invention is drawn towards such a system.

SUMMARY OF THE INVENTION

It is an object of the present invention to provide a system for managing the amortization of a loan which automatically resets the rate of interest stored in memory in response to the debtor's election, yet holds the rate of interest stored in memory fixed in the absence of such an election.

In accordance with the present invention, a system for managing the amortization of a loan to a debtor includes memory, a data input module, a module for tracking principal reduction and a rate adjustment option module. The memory stores data identifying a debtor, the amount of a loan to the debtor, the principal balance of the loan, a rate of interest payable on the principal balance of the loan and the term of the loan. The data input module inputs the identifying data into the memory and records information indicative of the time payments received from the debtor toward payment of principal and interest on the loan. The module for tracking the reduction in the principal balance of the loan also stores in memory the reduced principal balance in response to the time payments. The rate adjustment option module resets the rate of interest on the principal balance in response to the debtor's election. The rate of interest in the absence of the debtor's election and resetting is held fixed in the memory for the remaining term of the loan.

In accordance with another aspect of the present invention, a method for managing the amortization of a loan to a debtor includes the steps of storing in a memory data identifying the debtor, the amount of the loan to the debtor, the principal balance of the loan, an initial rate of interest payable on the principal balance of the loan and the term of the loan; recording in memory information identifying time payments received from the debtor for principal and interest on the loan as the payments are made; tracking the reduction in the principal balance of the loan and storing in the memory the principal balance in response to the time payments; resetting the initial rate of interest on the principal balance to a new rate of interest in response to the debtor's election; and maintaining the initial rate of interest for the balance of the term of the loan in the absence of the debtor's election and resetting of the rate of interest.

DESCRIPTION OF PREFERRED EMBODIMENT

Figure 1:
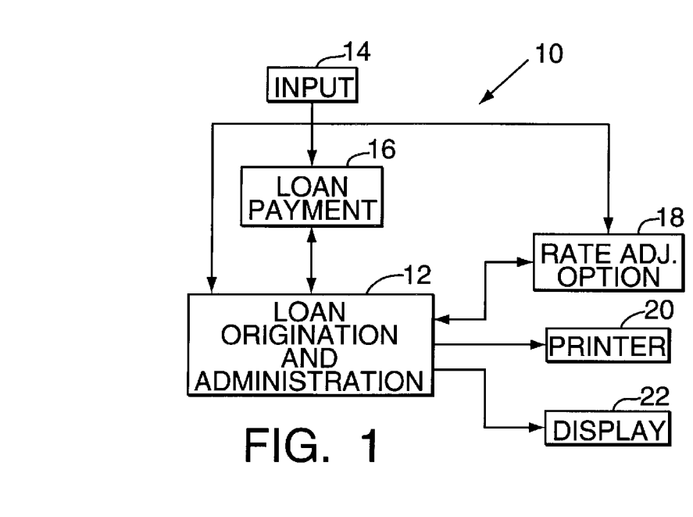
FIG. 1 is a schematic illustration of a system for managing the amortization of a loan.

Referring now to FIG. 1, there is shown a simplified schematic illustration of a system 10 with software programs for managing the amortization of a loan. The system 10 illustrated in FIG. 1 is preferably implemented by modifying existing systems for managing the amortization of loans. Thus, the present invention may be constructed without a significant investment in system architecture design and software development.

The system 10 is a computing platform which operates in accordance with software provided on a storage medium, such as a conventional hard drive, to perform process steps as described herein. The computing platform includes other conventional computer peripheral devices necessary for its functionality. As is known in the art, a single conventional computer may perform steps in accordance with a plurality of software modules. Alternatively, the functions of several software modules may be performed by a plurality of computers. In the preferred embodiment, the various modules described herein execute the program functions on a single computer unless otherwise noted.

An input 14, which may be a keyboard and/or mouse for regarding to prompts generated by the software on a display 22, serves as an interface between the system 10 and an operator or user (not shown) of the system 10, such as a loan officer. In response to user input actions, such as keystrokes and mouse movements, the input module generates identifying signals indicative of loan information. The input module also records time payment signals indicative of time payments received from the debtor for credits toward payment of principal and interest on the loan and escrow funds. Such time payment signals preferably comprise signals which identify the debtor and signals indicative of the amount of the time payment. The input module 14 generates and transmits the identifying signals to a loan origination and administration module 12.

Figure 2:
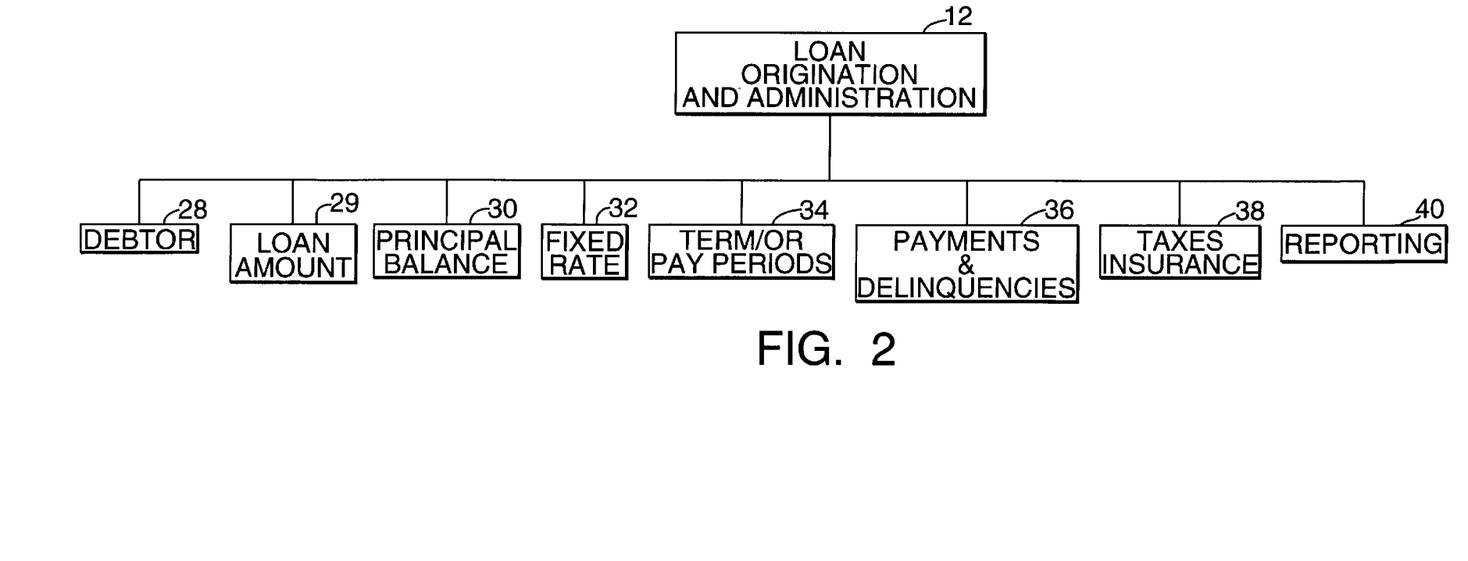
FIG. 2 is a schematic illustration of different types of information stored and processed by a loan origination and administration module of the system of FIG. 1.

The loan origination and administration module 12 processes and stores in memory therewithin the identifying signals. FIG. 2 is a schematic illustration of the information represented within the module 12. At the time of loan origination the module 12 receives and stores identifying signals indicative of the debtor 28, the amount of the loan to the debtor 29, the principal balance 30 of the loan, the fixed rate of interest 32 payable on the principal balance of the loan and the term 34 of the loan. During the course of the loan the module 12 further stores the received time payments, as well as delinquencies in the time payments, as indicated by reference numeral 36. In the preferred embodiment, the module 12 furthermore stores signals indicative of other required payments, such as taxes and insurance 38, which are paid along with the principal and interest on the loan and set aside in escrow.

The module 12 further generates signals indicative of reports 40 for presenting the identifying data. A report is typically a monthly statement or year-end report and consists of a formatted table describing loan status information, such as previously received time payments, the current principal balance, when the next time payment is due and whether the time payment is delinquent. However, a report may present identifying data in other graphical and textual formats without departing from the scope of the present invention.

Referring again to FIG. 1, the report signals are displayed to the operator of the system 10 through conventional computer output devices. In the preferred embodiment, a printer 20 and a display 22 receive the report signals from the loan origination and administration module 12, and generate in dependence thereupon reports to the operator in textual or graphical form in a manner known in the art.

Figure 3:
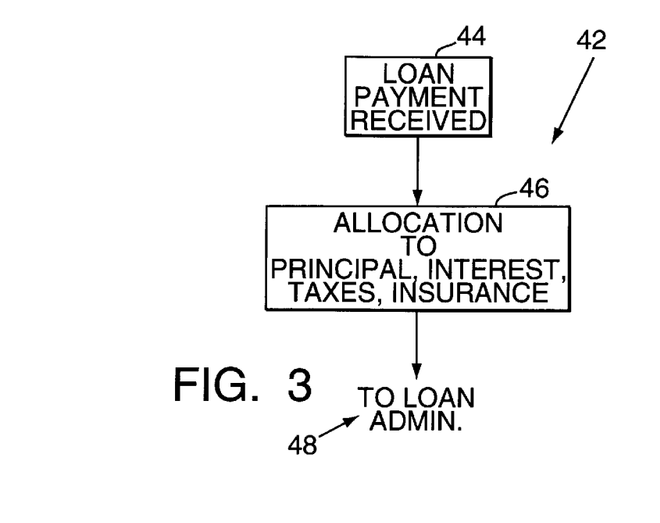
FIG. 3 is a flow chart describing steps performed in processing a received time payment.

FIG. 3 depicts a flowchart 42 which describes the steps performed in processing a received time payment in the loan payment module 16 (FIG. 1). The module receives the time payment signals from the input module 14, as shown by step 44. The loan payment module 16 determines the appropriate allocation of the time payment between principal, interest in accordance with known amortization methods, and allocates taxes, insurance another escrow items in accordance with preset payment plans, as shown by step 46. The appropriate allocation of a payment to P & I typically depends on the principal balance, the interest rate, and the stage or remaining term of the loan. Accordingly, the loan payment module 16 receives signals indicative of the principal, rate and term from the loan origination and administration module 12, and generates in dependence thereupon signals indicative of the amount by which to reduce the principal balance of the loan. As shown by step 48, the loan origination and administration module 12 receives the principal reduction signals and tracks the reduction in the principal balance by the remaining term or number of payment periods 34 is also decremented time payments. Reduced principal signals 30 are then stored in memory awaiting the next time payment.

In accordance with the present invention a rate adjustment option module 18 receives from the input module 14 election signals indicative of an election by the debtor to reset the interest rate of the loan. As described hereinabove, the debtor typically makes such an election when prevailing interest rates have fallen significantly below the interest rate of the loan.

In response to the election signals, the rate adjustment option module 18 resets the rate of interest 32 on the principal balance 30 by adjusting the signals indicative of the rate of interest. The rate adjustment option module 18 preferably adjusts the interest rate signals in accordance with signals stored in memory in a table of current rates, or yields. The rates in the table are based upon a known index, such as the Federal National Mortgage Association's required net yield on mortgage loans, and, in one embodiment of the invention, the current rates in the table are determined from the index value by adding a margin established by the lending institution and then rounding the rate to the nearest 1/8th of a point (0.00125). The table of current rates in the memory includes multiple rates, or yields, for different types of mortgage loans, such as a 15-year fixed rate, a 30-year fixed rate, a jumbo fixed rate, an FHA mortgage rate and so on. If the loan to the debtor is a given type of mortgage loan which corresponds to a rate in the table, the rate adjustment option module 18 resets the rate of interest based upon the current rate or yield corresponding to the given type of mortgage loan held by the debtor.

Figure 4:
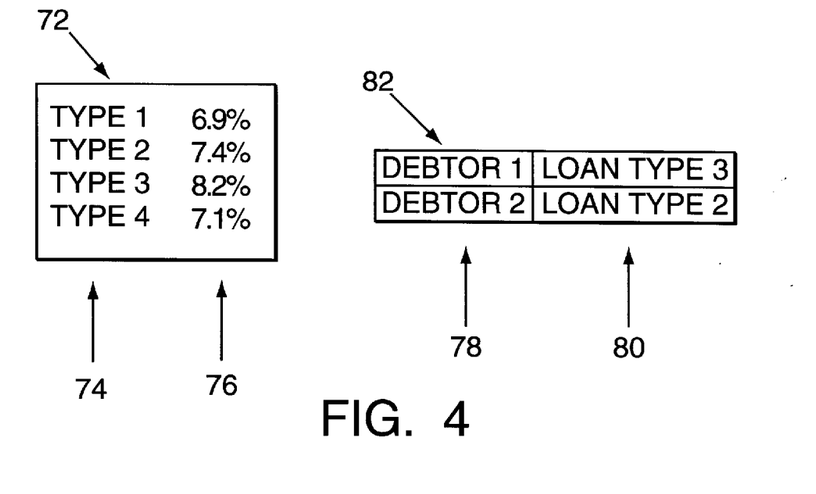
FIG. 4 is a chart which illustrates an example of a table of current interest rates.

FIG. 4 illustrates an example of a table 72 of current rates 76. Each of the set of rates 76 is associated with one of a set 74 of types of mortgages. Other identifying information 82 in memory indicates the debtor 78 and the type of mortgage 80 held by the debtor 78. If the debtor's mortgage 80 is a "Type 3", then the debtor's rate of interest set by the rate adjustment option module 18 would be the interest rate in the set 76 which corresponds to a "Type 3" mortgage, that is, the rate 8.2%.

As described hereinabove, the time payments are due at predetermined payment intervals during the term of the loan, such as every month. In preferred embodiment the rate adjustment option module 18 resets the rate of interest to become effective at the beginning of a payment interval, typically the first payment interval, after the debtor's election. For example, if payment intervals start on the first day of each month and the debtor makes his election on Sep. 1, 1996, the reset rate of interest becomes effective Oct. 1, 1996 and the first time reflecting the new rate would be due on Nov. 1, 1996 since interest is always paid in arrears.

Figure 5:
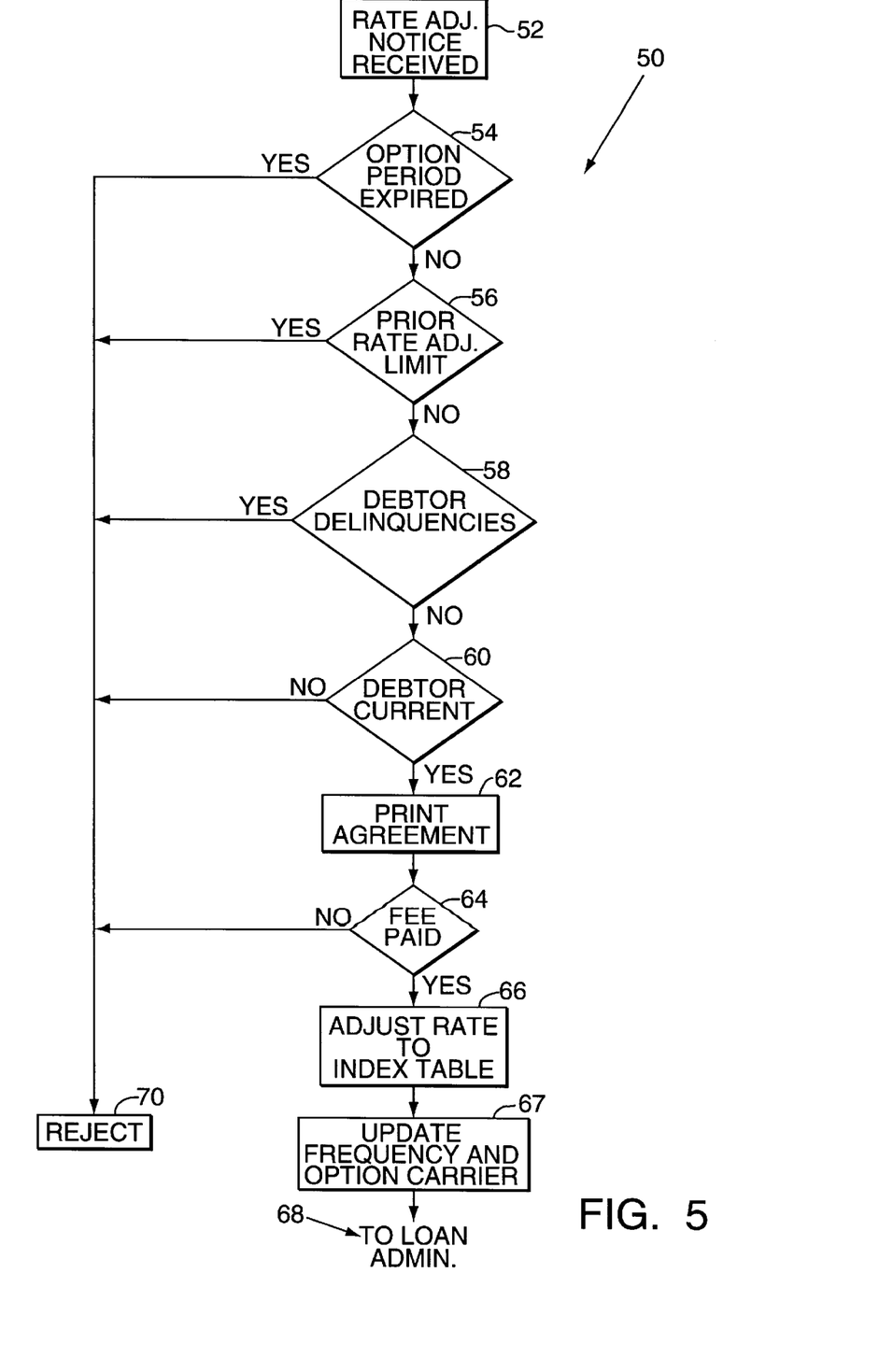
FIG. 5 is a flow chart describing steps performed the rate adjustment option module of FIG. 1.

It is preferred that resetting of the interest rate is not permitted at all times, but is permitted in accordance with prescribed restrictions described hereinbelow. FIG. 5 illustrates a flow chart 50 which describes steps performed by the rate adjustment option module 18(FIG. 1) in receiving an election to reset a rate.

It is preferable to limit rate resetting to prescribed periods of time, rather than at any time during the term of the loan. The rate adjustment option module 18 limits the resetting of the rate of interest to a prescribed option period within the term of the loan. The option period is preferably early in the term, and furthermore starts at the beginning of the term. A typical option 15 year or for a 30 period mortgage loan is the period extending three years from the beginning of the term. Upon receiving signals indicative of a debtor election, as shown by step 52, the rate adjustment option module 18 determines whether the option period has expired, as shown by step 54. If so, rate adjustment is rejected, as shown by step 70. Otherwise, the process of qualifying the debtor and the election continues The rate adjustment option module 18 also limits the number of times the rate of interest is reset within the term of the loan, as well as the frequency of resetting the rate. For example, the rate may be reset a maximum of four times during the term of the loan, and at a frequency of not more than twice per year. The memory stores signals indicative of the number of permitted elections and the frequency of permitted elections, as well as signals indicative of past elections and when the elections were made. After determining at step 54 that the option period has not expired, the rate adjustment option module 18 determines whether the number of permitted elections or the frequency of permitted elections has been exceeded, as shown by step 56. If so, rate adjustment is rejected, as shown by step 70.

If a debtor has not made the currently due or, previous time payments on a timely basis, the delinquencies are recorded in memory(see FIG. 2 at 36), and he may not be granted the benefit of a rate reduction. Accordingly, the rate adjustment option module 18 limits the resetting of the rate of interest in response to recorded delinquencies or a currently due time payment. Rate adjustment may be prohibited if any payments are delinquent or if a prescribed number of late payments is exceeded. After determining at step 56 that the number and frequency of permitted elections has not been exceeded, the rate adjustment option module 18 ascertains from memory whether the debtor is delinquent, as shown by step 58. Similarly, the rate adjustment option module 18 ascertains whether the debtor has made a time payment for the current payment interval, as shown by step 60. If the debtor is either delinquent or not current, rate adjustment is rejected, as shown by step 70.

If the debtor is not delinquent and is current, the system 10 (FIG. 1) prints a contract or agreement setting out the new payment terms including the new rate of interest, the new time payment and the new term, if applicable, and authorizing the lending institution to change the interest rate, as shown by step 62. The debtor may typically be required to sign the agreement and pay a fee for the rate reduction. Once the system receives signals indicative of the fee payment, as shown by step 64, the rate is adjusted, as shown by step 66. The loan administration module 12(FIG. 1) then receives the adjustment information and processes new time payments in conjunction with the loan payment module 16 based upon the new interest rate and other changes, as shown by step 68.

In response to the debtor's election and the resetting of the rate of interest, the amount of the required time payment or the remaining term of the loan may be reduced, or both may be adjusted. The operator selects what is to be reduced via the input module 14.

Figure 6:
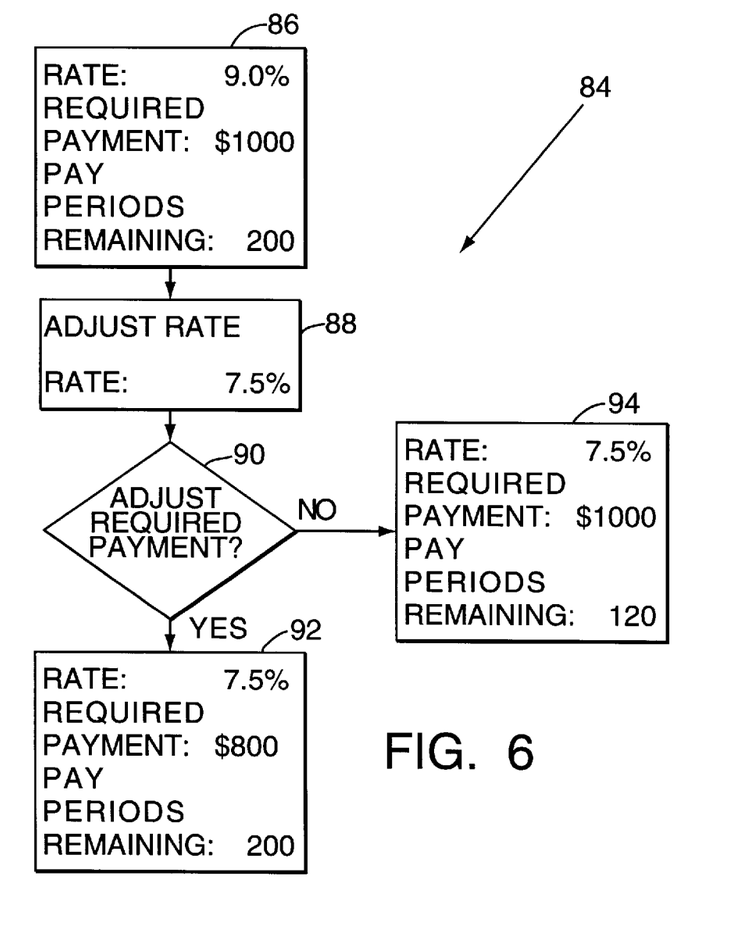
FIG. 6 is a flow chart which illustrates changes which occur in a sample loan upon an election of a debtor.

FIG. 6 shows a flow chart 84 which illustrates a payment/term routine that in one embodiment of the invention may be interposed between the rate adjustment module 18 as outlined in FIG. 5 and the loan origination and administration module 12 in FIG. 2. The payment/term routine changes either the time payment or the balance of the loan term in response to the debtor's newly elected rate of interest. Step 86 shows the rate of interest, required time payments and number of required time payments remaining for the loan before the election and rate change. Step 88 shows the rate after election and rate changes in accordance with the adjustment module. At step 90, the system permits the debtor to choose to reduce the amount of the required time payment or the remaining term of the loan. If he chooses to reduce the required time payment, then the payment is reduced and the remaining term is unchanged, as shown by step 92. The reset required time payment amount depends on the reset rate of interest, the remaining term of the loan and principal balance of the loan, as is known in the art. In response to the reset time payment amount, the loan payment module 16 allocates received time payments between principal and interest in accordance with known amortization methods.

If the debtor instead chooses to reduce the remaining term, then the remaining term is reduced but the required time payment is unchanged, as shown by step 94. The reset term depends on the reset rate of interest, the required time payment and the principal balance of the loan to the debtor. In response to the reset term, the loan payment module 16 re-allocates the amount of the time payments between principal and interest in accordance with known amortization methods.

In the absence of the debtor's election and resetting, the loan rate of interest is held fixed in the memory for the remaining term of the loan. Thus, without an election, the system 10(FIG. 1) accepts and processes signals indicative of time payments as if the system 10 were processing payments on a fixed-rate loan.

As described hereinabove, the computing platform on which the present invention is implemented receives input signals indicative of user input information and user selections, and transforms those input signals into signals for resetting the otherwise fixed rate of interest. The system also processes time payments and produces reports at monthly or year-end intervals, which describe loan status information. The reports are typically presented in textual or graphical form to a user by means of the display 22 or a paper print-out from the computer printer 20. The computing platform therefore physically transforms the signals indicative of user input information and user selections.

By storing an executable system loan amortization management computer program in accordance with the present invention in a general purpose digital computer's memory, and executing the stored program, the stored program imparts loan amortization management functionality to the general purpose digital computer by changing the state of the computer's arithmetic logic unit when program instructions of the loan amortization management program are executed.

The present invention has applicability in managing loans to debtors and transactions associated with those loans. This management is valuable to lending institutions seeking to efficiently and competitively manage loans, particularly mortgage loans. The management is also valuable to debtors seeking to adjust the interest rate on their loans without having to go through a refinancing process.

Although the invention has been shown and described with respect to a preferred embodiment thereof, it would be understood by those skilled in the art that other various changes, omissions and additions thereto may be made without departing from the spirit and scope of the present invention. For example, the display may be a computer monitor which is connected via a global computer network to the above-described system for managing the amortization of a loan. The displayed reports are thereby available to a user who is remote from the system. Accordingly the present invention has been described in several preferred embodiments by way of illustration rather than limitation.

What is claimed is:

1. In a data processing system for managing the amortization of a loan to a debtor including:

memory means for storing data identifying the debtor, the amount of the loan to the debtor, the principal balance of the loan, a rate of interest payable on the principal balance of the loan and the term of the loan;

data input means for inputting the identifying data into the memory means and recording information identifying the time payments received from the debtor toward payment of principal and interest on the loan; and means for tracking and outputting the reduction in the principal balance of the loan and storing in the memory means the principal balance in response to the time payments;

the improvement comprising:

rate adjustment option means for resetting the rate of interest on the principal balance in response to the debtor's election, the rate of interest in the absence of the debtor's election and resetting being held fixed in the memory means for the remaining term of the loan.

2. The system for managing the amortization of a loan as defined in claim 1 wherein the rate adjustment option means includes means for resetting the amount of the time payment required to retire the loan in response to the reset rate of interest, the remaining term of the loan and principal balance of the loan to the debtor.

3. The system for managing the amortization of a loan as defined in claim 2 further including:

loan payment module means for allocating time payments received between principal and interest paid on the loan; and wherein the loan payment module means is responsive to the means for resetting for allocating the reset amount of the time payments between principal and interest.

4. The system for managing the amortization of a loan as defined in claim 1 wherein the rate adjustment option means includes means for resetting the term of the loan or the number of remaining payment periods in response to the reset rate of interest, required time payment and the principal balance of the loan to the debtor.

5. The system for managing the amortization of a loan as defined in claim 4 further including:

loan payment module means for allocating time payments between principal and interest paid on the loan; and wherein the loan payment module means is responsive to the means for resetting for re-allocating the amount of the time payments between principal and interest.

6. The system for managing the amortization of a loan as defined in claim 1 wherein: a table of current rates(or yields) based upon a known index is also stored in the memory means; and the rate adjustment option means resets the rate of interest based upon the table of current rates.

7. The system of claim 6 wherein: the loan to the debtor is a given type of mortgage loan; the table of current rates in the memory means includes multiple rates(or yields) for different types of mortgage loans; and the rate adjustment option means resets the rate of interest based upon the current rate(or yield) applicable to the given type of mortgage loan held by the debtor.

8. The system of managing the amortization of a loan as defined in claim 1 wherein:

the rate adjustment option means includes means for limiting the resetting of the rate of interest to an option period within the term of the loan.

9. The system of claim 8 wherein: the option period falls early in the term of the loan.

10. The system of claim 8 wherein: the option period starts at the beginning of the term of the loan.

11. The system of managing the amortization of a loan as defined in claim 1 wherein:

the rate adjustment option means includes means for limiting the number of times the rate of interest is reset within the term of the loan.

12. The system of managing the amortization of a loan as defined in claim 1 wherein:
the rate adjustment option means includes means for limiting the frequency of resetting the rate of interest within the term of the loan.

13. The system of managing the amortization of a loan as defined in claim 1 wherein:
means are provided for recording in the memory means delinquencies in the receipt of time payments from the debtor; and
the rate adjustment option means includes means for limiting the resetting of the rate of interest in response to recorded delinquencies.

14. The system of managing the amortization of a loan as defined in claim 1 wherein:
the time payments are due at predetermined payment intervals during the term of the loan; and
the rate adjustment option means resets the rate of interest to become effective at the beginning of a payment interval after the debtor's election.

15. The system of claim 14 wherein: the rate of interest becomes effective for the first payment interval after the debtor's election.

16. In a data processing system for managing the amortization of a loan to a debtor, the method including the steps of:
storing in a memory data identifying the debtor, the amount of the loan to the debtor, the principal balance of the loan an initial rate of interest payable on the principal balance of the loan and the term of the loan;
recording in memory information identifying time payments received from the debtor for principal and interest on the loan as the payments are made; and
tracking and outputting the reduction in the principal balance of the loan and storing in the memory the principal balance in response to the time payments;
wherein the improvement comprises;
resetting the initial rate of interest on the principal balance to a new rate of interest in response to the debtor's election; and
maintaining the initial rate of interest for the balance of the term of the loan in the absence of the debtor's election and the resetting of the rate of interest.

17. The method for managing the amortization of a loan as defined in claim 16 wherein the step of resetting the rate of interest further includes the step of resetting the amount of the time payments in accordance with the reset rate of interest, the remaining term of the loan and the principal balance of the loan to the debtor.

18. The method of claim 17 further including the steps of allocating the time payments received between principal and interest on the loan before the resetting of the rate of interest, and re-allocating the reset time payments after the step of resetting in accordance with the reset rate of interest, and the remaining term of the loan.

19. The method for managing the amortization of a loan as defined in claim 16 further including the step of resetting the remaining term of the loan in accordance with the reset rate of interest, a required time payment and the principal balance of the loan to the debtor.

20. The method for managing the amortization of a loan as defined in claim 19 further including the steps of allocating the time payments between principal and interest paid on the loan before the resetting of the rate of interest, and re-allocating the time payments after the step of resetting the rate of interest in accordance with the reset rate of interest and the time payment.

21. The method for managing the amortization of a loan as defined in claim 16 wherein the step of resetting comprises resetting the rate of interest from a table in memory of current interest rates(or yields) based upon a known index.

22. The method of claim 21 wherein: the loan to the debtor is a given type of mortgage loan; the table in memory of current rates includes multiple rates(or yields) for different types of mortgage loans; and the step of resetting includes resetting the rate of interest based upon the current rate(or yield) applicable to the given type of mortgage loan held by the debtor.

23. The method of managing the amortization of a loan as defined in claim 16 further including the step of limiting the step of resetting the rate of interest to an option period within the term of the loan.

24. The method of claim 23 wherein the option period starts at the beginning of the term of the loan.

25. The method of claim 16 further including the steps of recording in memory and limiting the number of times the step of resetting takes place within the term of the loan.

26. The method of claim 16 further including the step of recording in memory the time when the step of resetting occurs; and limiting the frequency at which the step of resetting occurs within the term of the loan.

27. The method of claim 16 further including the steps of:
recording in memory the delinquencies in the receipt of time payments from the debtor during the term of the loan; and
limiting the step of resetting the rate of interest in response to the recorded delinquencies.

28. The method of managing the amortization of a loan as defined in claim 16 wherein:
the time payments are due at predetermined payment intervals during the term of a loan; and
the step of resetting includes resetting the rate of interest to become effective at the beginning of a payment interval after the debtor's election.

29. The method of claim 28 wherein the rate of interest becomes effective at the beginning of the first payment interval after the debtor's election.

30. In a data processing system for managing the amortization of a loan having a principal balance to a debtor including:
memory means for storing debtor identification signals which are indicative of the debtor, loan signals which are indicative of the amount of the loan, principal signals indicative of the principal balance of the loan, interest rate signals which are indicative of a rate of interest payable on the principal balance of the loan and term signals which are indicative of the term of the loan;
input means for inputting the identification signals, loan signals, principal signals, interest rate signals and term signals into the memory means and recording time payment signals which are indicative of time payments received from the debtor toward payment of principal and interest on the loan; and
means for tracking and outputting the reduction in the principal balance of the loan in response to the time payments, wherein the means for tracking and outputting adjusts the principal signals in accordance with the time payment signals;
the improvement comprising:

rate adjustment option means for adjusting the interest rate signals in response to election signals indicative of the debtor's elections, the interest rate signals in the absence of the election signals and adjusting being held fixed in the memory means for the balance of the term of the loan.

31. The system for managing the amortization of a loan as defined in claim 30 wherein the rate adjustment option means includes means for adjusting the time payment signals required to retire the loan in accordance with the adjusted interest rate signals, the term signals and the principal signals.

32. The system for managing the amortization of a loan as defined in claim 31 further including:

loan payment module means for allocating time payments received between principal and interest paid on the loan; and wherein the loan payment module means is responsive to the means for adjusting the term signals for allocating the adjusted time payment signals between principal and interest.

33. The system for managing the amortization of a loan as defined in claim 30 wherein the rate adjustment option means includes means for adjusting the term signals in response to the adjusted interest rate signals and the principal signals.

34. The system for managing the amortization of a loan as defined in claim 33 further including:

loan payment module means for allocating time payments between principal and interest paid on the loan; and wherein the loan payment module means is responsive to the means for adjusting the term signals for re-allocating the time payment signals between principal and interest.

35. The system for managing the amortization of a loan as defined in claim 30 wherein: current rate signals indicative of a set of current rates (or yields) which are based upon a known index are also stored in the memory means; and the rate adjustment option means adjusts the interest rate signals in dependence upon the current rate signals.

36. The system of claim 35 wherein: the loan signals are further indicative of a given type of mortgage loan; the current rate signals stored in the memory means are indicative of multiple rates (or yields) for different types of mortgage loans; and the rate adjustment option means adjusts the interest rate signals in dependence upon the current rate signals applicable to the given type of mortgage loan indicated by the loan signals.

37. The system of managing the amortization of a loan as defined in claim 30 wherein:

the rate adjustment option means includes means for limiting the adjustment of the interest rate signals to an option period within the term of the loan.

38. The system of claim 37 wherein: the option period falls in the first half of the term of the loan.

39. The system of claim 38 wherein: the option period starts at the beginning of the term of the loan.

40. The system of managing the amortization of a loan as defined in claim 30 wherein:

the rate adjustment option means includes means for limiting the number of times the interest rate signals are adjusted within the term of the loan.

41. The system of managing the amortization of a loan as defined in claim 30 wherein:

the rate adjustment option means includes means for limiting the frequency of adjusting the interest rate signals within the term of the loan.

42. The system of managing the amortization of a loan as defined in claim 30 wherein:

means are provided for storing in the memory means delinquency signals indicative of delinquencies in the receipt of time payment signals; and the rate adjustment option means includes means for limiting the adjusting of the interest rate signals in response to the stored delinquency signals.

43. The system of managing the amortization of a loan as defined in claim 30 wherein:

the time payment signals are due at predetermined payment intervals during the term of the loan; and the rate adjustment option means adjusting the interest rate signals to become effective at the beginning of a payment interval after receiving the election signals.

44. The system of claim 43 wherein: the adjustment of the interest rate signals becomes effective for the first payment interval after the election signals are received.

45. In a data processing system for managing the amortization of a loan having a principal balance to a debtor, the method including the steps of:

storing in a memory debtor identification signals which are indicative of the debtor, loan signals which are indicative of the amount of the loan to the debtor, principal signals indicative of the principal balance of the loan, interest rate signals which are indicative of a rate of interest payable on the principal balance of the loan and term signals which are indicative of the term of the loan;

recording time payment signals which are indicative of time payments received from the debtor for payment of principal and interest on the loan as the payments are made; and tracking and outputting the reduction in the principal signals in response to the time payment signals;

wherein the improvement comprises;

adjusting the initial interest rate signals to new interest rate signals in response to election signals indicative of the debtor's election; and maintaining the initial interest rate signals for the balance of the term of the loan in the absence of the election signals and the adjusting of the interest rate signals.

46. The method for managing the amortization of a loan as defined in claim 45 wherein the step of adjusting the interest rate signals further includes the step of adjusting the time payment signals in accordance with the new interest rate signals, the term signals and the principal signals.

47. The method of claim 46 further including the steps of allocating the time payment signals received between principal and interest on the loan before the adjusting of the interest rate signals, and re-allocating the adjusted time payment signals after the step of adjusting in accordance with the adjusted interest rate signals, and the remaining term of the loan.

48. The method for managing the amortization of a loan as defined in claim 45 further including the step of adjusting the term signals in accordance with the adjusted interest rate signals, the time payment signals required to retire the loan and the principal signals.

49. The method for managing the amortization of a loan as defined in claim 48 further including the steps of allocating the time payment signals between principal and interest paid on the loan before the adjusting of the interest rate signals, and re-allocating the time payment signals after the step of adjusting the interest rate signals in accordance with the adjusted the interest rate signals and the time payment signals.

50. The method for managing the amortization of a loan as defined in claim 45 wherein the step of adjusting comprises adjusting the interest rate signals in accordance with current rate signals stored in memory which are indicative of current interest rates (or yields) based upon a known index.

51. The method of claim 50 wherein: the loan signals are further indicative of a given type of mortgage loan; the current rate signals stored in the memory means are indicative of multiple rates (or yields) for different types of mortgage loans; and the step of adjusting includes adjusting the interest rate signals in dependence upon the current rate signals applicable to the given type of mortgage loan indicated by the loan signals.

52. The method of managing the amortization of a loan as defined in claim 45 further including the step of limiting the step of adjusting the interest rate signals to an option period within the term of the loan.

53. The method of claim 52 wherein the option period starts at the beginning of the term of the loan.

54. The method of claim 45 further including the step of recording in memory and limiting the number of times the step of adjusting takes place within the term of the loan.

55. The method of claim 45 further including the step of recording in memory signals indicative of the time when the step of adjusting occurs; and limiting the frequency at which the step of adjusting occurs within the term of the loan.

56. The method of claim 45 further including the steps of:

recording in memory delinquency signals indicative of delinquencies in the receipt of time payments from the debtor during the term of the loan; and limiting the step of adjusting the interest rate signals in response to the recorded delinquency signals.

57. The method of managing the amortization of a loan as defined in claim 45 wherein:

the time payment signals are due at predetermined payment intervals during the term of a loan; and the step of adjusting includes adjusting the interest rate signals to become effective at the beginning of a payment interval after receiving the election signals.

58. The method of claim 57 wherein the adjustment of the interest rate signals becomes effective at the beginning of the first payment interval after the election signals are received.

* * * * *